(12) United States Patent
Klement

(10) Patent No.: US 6,794,794 B2
(45) Date of Patent: Sep. 21, 2004

(54) TORSION OSCILLATOR STABILIZATION

(75) Inventor: Martin Christopher Klement, Lexington, KY (US)

(73) Assignee: Lexmark International, Inc., Lexington, KY (US)

(*) Notice: Subject to any disclaimer, the term of this patent is extended or adjusted under 35 U.S.C. 154(b) by 0 days.

(21) Appl. No.: 10/689,175

(22) Filed: Oct. 20, 2003

(65) Prior Publication Data

US 2004/0125198 A1 Jul. 1, 2004

Related U.S. Application Data

(62) Division of application No. 10/093,754, filed on Mar. 8, 2002.

(51) Int. Cl.$^7$ .............................................. H01L 41/08
(52) U.S. Cl. .................... 310/311; 310/316.01; 318/116
(58) Field of Search ................ 318/116–118, 125–134; 310/316.01, 31

(56) References Cited

U.S. PATENT DOCUMENTS

| | | | |
|---|---|---|---|
| 3,803,637 A | | 4/1974 | Martin et al. |
| 4,032,888 A | * | 6/1977 | Broyles et al. ............. 382/322 |
| 4,037,231 A | * | 7/1977 | Broyles et al. ............. 347/246 |
| 4,317,611 A | | 3/1982 | Petersen |
| 4,344,677 A | | 8/1982 | Stuermer et al. |
| 4,418,567 A | * | 12/1983 | Boning et al. ............. 73/35.03 |
| 4,630,223 A | | 12/1986 | Schoon |
| 4,762,994 A | | 8/1988 | Byerly et al. |
| 5,157,650 A | | 10/1992 | Ozue et al. |
| 5,543,956 A | | 8/1996 | Nakagawa et al. |
| 5,606,447 A | | 2/1997 | Asada et al. |
| 5,629,790 A | | 5/1997 | Neukermans et al. |
| 5,745,294 A | | 4/1998 | Kudo |
| 5,767,666 A | | 6/1998 | Asada et al. |
| 5,841,553 A | | 11/1998 | Neukermans |
| 5,880,765 A | | 3/1999 | Ueda et al. |
| 5,953,103 A | | 9/1999 | Nakamura |
| 5,959,760 A | | 9/1999 | Yamada et al. |
| 6,069,727 A | | 5/2000 | Cho et al. |
| 6,285,383 B1 | | 9/2001 | Klement et al. |
| 6,295,154 B1 | | 9/2001 | Laor et al. |
| 6,411,321 B2 | | 6/2002 | Tanimoto et al. |

FOREIGN PATENT DOCUMENTS

WO      WO 89/12369      12/1989

OTHER PUBLICATIONS

Texas Instruments Product Review, Multi–Topology Piezoelectric Transformer Controller, Nov. 2001, p. 1–27 and page headed "Important Notice".

* cited by examiner

Primary Examiner—Mark Budd
(74) Attorney, Agent, or Firm—Luedeka, Neely & Graham

(57) ABSTRACT

A torsion oscillator (FIG. 1) is stabilized in operation by determining the current resonant frequency (62); in a first procedure, observing the oscillator for change in resonant frequency (64), and then restoring the amplitude and median offset (66) without changing the drive frequency. In an alternative procedure, after determining the resonant frequency (62); setting the drive frequency close to but offset from the current resonant frequency (74), observing the oscillator for change in resonant frequency (76), and the restoring the close offset to the changed resonant frequency (78). By operating slightly off peak, the direction of resonant change is immediately known. The first procedure has less difficulties in implementation, but requires more power.

9 Claims, 3 Drawing Sheets

TORSION OSCILLATOR STABILIZATION

This application is a division of Ser. No. 10/093,754 filed Mar. 8, 2002.

FIELD OF THE INVENTION

Torsion oscillators are typically driven by electrical signals applied at the resonant frequency of a body mounted between torsion members. This invention addresses the stabilization of torsion oscillators as their resonant frequency varies.

BACKGROUND OF THE INVENTION

Torsion oscillators are known, although not widely employed. U.S. Pat. No. 4,762,994 to Byerly et al., U.S. Pat. No. 5,543,956 to Nakagawa et al. and U.S. Pat. No. 5,767,666 to Asada et al. are illustrative. An illustration of a galvanometric torsion oscillator is shown in FIG. 1. (The term galvanometric is believed to be a reference to coils on the turning member operated in the manner of a common galvanometer.)

The torsion oscillator of FIG. 1 comprises a central rectangular plate 1 suspended by two extensions 3a, 3b of the material of plate 1. Extensions, 3a, 3b are integral with a surrounding frame 5. Typically, the plate 1, extensions 3a, 3b and frame 5 are cut or etched from a single silicon wafer. A coil 7 of conductive wire and a region 9 of reflective mirror material are placed on the central plate.

This entire assembly is located inside a uniform magnetic field 11 (shown illustratively by lines with arrows), such as from opposing permanent magnets (not shown). When a current passes through coil 7, a force is exerted on coil 7 which is translated to plate 1 since coil 7 is attached to plate 1. This force causes rotation of plate 1 around extensions 3a, 3b which twist with reverse inherent torsion.

Other means may be employed to make such a system oscillate, such as static electricity or external magnetic fields. Various ones of such means are known in the prior art. The use of a coil drive by electric current in the embodiments disclosed herein should be considered illustrative and not limiting.

The spring rate of extensions 3a, 3b and the mass of plate 1 constitute a rotational spring-mass system with a specific resonant frequency. Plate 1 can be excited to oscillate at the resonant frequency with an alternating level passing through the coil and having a frequency at the resonate frequency or having some other frequency, such as harmonic at the resonate frequency. Where the input frequency varies from the resonant frequency and is substantial in power, plate 1 oscillates at the input frequency but drive level to coil 7 must be higher to achieve the same sweep (extent of oscillation) of plate 1. The device functions as a laser scanner when a laser is directed at the oscillating surface of mirror 9, thereby replacing the much bulkier rotating polygonal mirror widely used in laser printers and copiers. Torsion oscillators also have other applications, such as to drive a clocking device, in which mirror 9 would not be used.

The angle of mirror 9 moves sinusoidally with respect to time at a certain amount of sweep (termed amplitude), in a certain repetition rate (termed frequency), and with a potential lack of symmetry with respect to the using apparatus (termed median offset). These elements must be stabilized for useful operation. But the characteristics of a torsion oscillator can vary significantly from manufacturing tolerances and changing environmental conditions. Moreover, the direction of frequency drift is not readily determined since amplitude falls for drift to both higher and lower frequency. This invention provides two alternative control procedures which stabilize operation as the resonant frequency shifts during use.

DISCLOSURE OF THE INVENTION

In accordance with a first control procedure of this invention, drift is observed by sensing a reduction in amplitude. In response the original drive frequency is maintained and previous amplitude is restored by an increase in drive level and any undesired median offset is eliminated by an opposite change in the median of the drive level. This is the preferred control procedure where drift will not be so great as to overcome available power or power-use limits of the oscillator. This procedure is not preferred where the necessary level of power is impractical or the associated financial costs are too high.

In accordance with a second control procedure of this invention, the frequency of the drive signal to the torsion oscillator is set a small amount offset below or above resonate frequency. The direction of this frequency offset is known. Operation of the oscillator is observed to determine the amplitude of the oscillator (this may be inferred from the time the light of a scan beam activates a sensor twice). When the offset is below and the amplitude increases the drive frequency is reduced to stay below the new resonant frequency, when the offset is below and the amplitude decreases, the drive frequency is increased to remain close to the new resonant frequency. Similarly when an above offset is used and the amplitude increases, the drive frequency is increased to stay below the new resonant frequency. When an above offset is used and the amplitude decreases, the drive frequency is reduced to remain close to the new resonate frequency.

Operation of the device using the oscillator is necessarily at the power input frequency for both of the foregoing control procedures. Accordingly, operating frequency of the using device for the first control method remains fixed, while operating frequency for the second control method varies continually.

DETAILED D SCRIPTION OF THE DRAWINGS

The details of this invention will be described in connection with the accompanying drawings, in which FIG. 1 describes a representative torsion oscillator known in the prior art;

DESCRIPTION OF THE PREFERRED EMBODIMENT

The natural resonant frequency of a torsional oscillator is typically very sharply defined, meaning that scan amplitude drops significantly if the drive lever is held constant but drive frequency varies to either side of the resonant frequency. Also, the natural resonant frequency of a particular device can change easily with environmental conditions such as temperature. Typically, because of thermal expansion of material in the oscillator, resonant frequency drops with increasing temperature.

Figure 2:
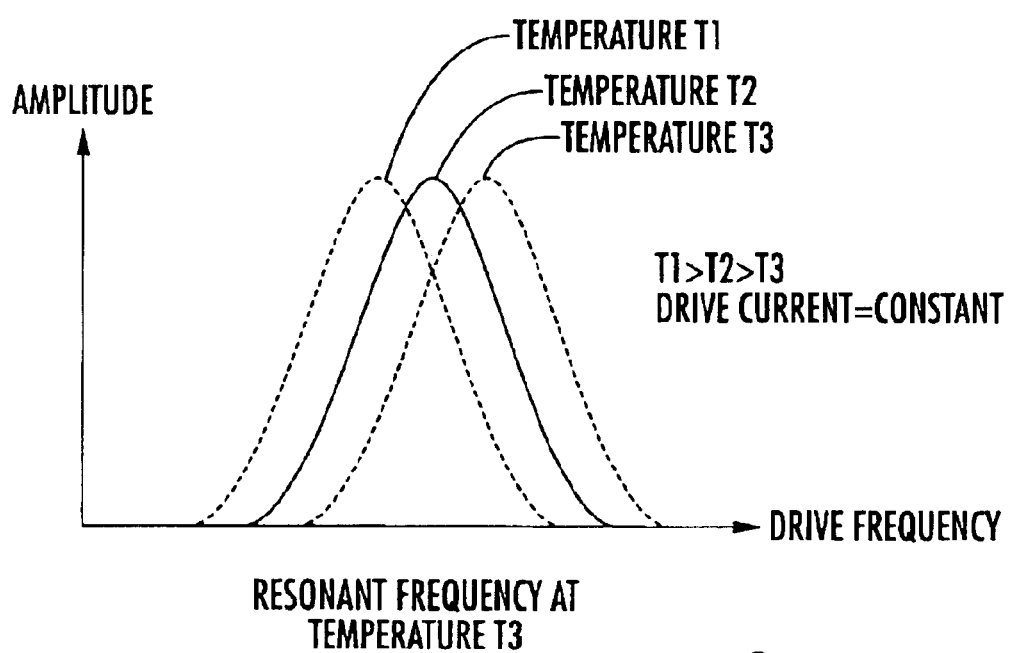
FIG. 2 illustrates a typical oscillator resonant frequency response with varying temperature.

FIG. 2 is a plot of such a typical system response with drive frequency as the horizontal axis and amplitude as the vertical axis, at constant drive level. The left, dashed graph shows the response of the system at a temperature T1, which is the lowest temperature illustrated. The solid graph shows response of the system at a temperature T2 which is higher than T1 but lower than T3, T2 being roughly centered in temperature between T1 and T3. The right, dashed graph shows the response of the system at the temperature T3.

As is apparent from FIG. 2, where the drive frequency is at the resonant frequency and the resonant frequency changes, at constant drive level the amplitude is substantially the same at different resonant frequencies driven at the resonant frequency. A new resonant frequency caused by change in temperature or other ambient factors could be either higher or lower. Stabilization at the same drive level would be by changing the drive frequency to the new resonant frequency, but that frequency could either be higher or lower.

In accordance with a first control procedure of this invention, the ambiguity of frequency drift is eliminated as a factor by maintaining the drive frequency at the original frequency while maintaining the amplitude by increasing power level and, when needed, changing the median drive level to eliminate undesired median offset. This method allows the device using the torsional oscillator to operate mostly at a single frequency, with only periodic adjustments to this operating frequency.

In accordance with a second control procedure of this invention the torsion oscillator is driven at a frequency having a small offset from the resonant frequency in a known sense of higher or lower. The direction of resonant frequency shift is then known and the drive frequency changed accordingly, but with a small offset from the new resonant frequency so that the stabilization can be continued around the new frequency. As is apparent from the rising and falling response around the resonant frequency, if the offset frequency is below resonant frequency and amplitude increases, the resonant frequency has decreased; if the offset frequency is below resonant frequency and amplitude decreases, the resonant frequency has increased. The drive frequencies are moved to restore the small offset. When the offset frequency is above the resonant frequency, the move of drive frequency to restore the small offset is in the opposite direction. The offset should be enough to assure stabilization as described with an additional amount to be sure tolerance variations will not affect operation. Operating at an offset does reduce amplitude or increase power consumption, but not materially for many if not all applications if the offset is small.

This method is operative with a device using the torsional oscillator which continuously accommodates the varying operating frequency of the oscillator.

Control System

Apparatus to control the torsion oscillator in accordance with this invention would necessarily involve electronic control, such as a microprocessor or combinational logic in the form of an Application Specific Integrated Circuit (commonly termed an ASIC). Details of such implementation may be conventional.

Figure 1:
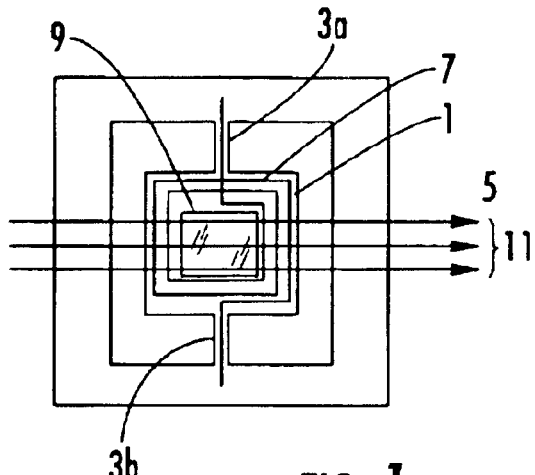
Figure 3:
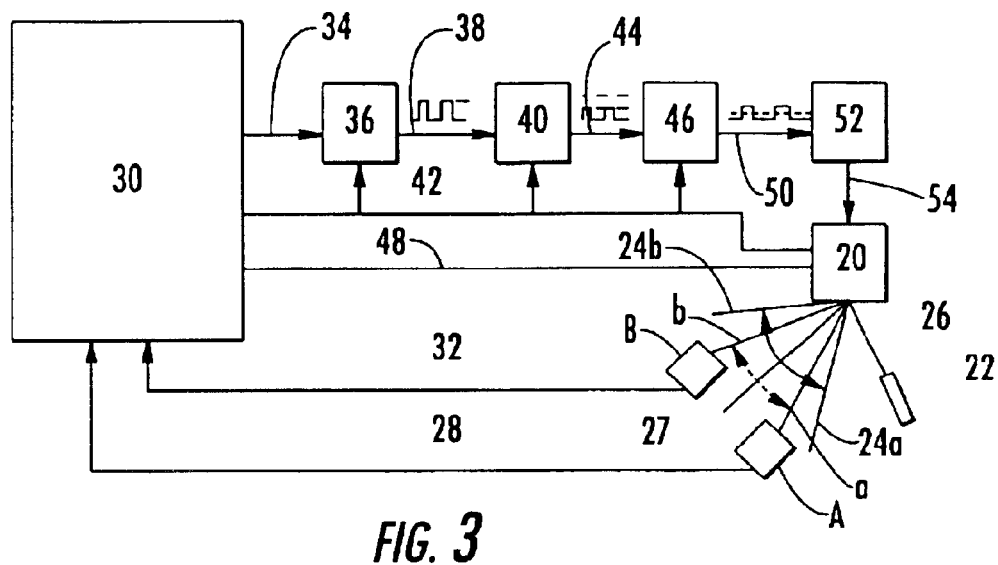
FIG. 3 is a schematic illustration of a system using this invention.

A representative, schematic illustration of such an implementation is shown in FIG. 3. An oscillator 20 may be that of FIG. 1. A laser 22 trains on the reflective surface (mirror 9, FIG. 1). Scan ampliture of light reflected is shown by broken lines 24a, 24b indicating the outer limits of the reflected light and arrow 26 indicating the largest angle of the scan. Middle line 27 is at a zero angle of scan.

Two sensors, A and B, are located within the angle of scan. Sensor A upon receiving the reflected light creates an electrical signal on line 28 to control logic 30, which may be a microprocessor. Sensor B, upon receiving the reflected light, also creates an electrical signal on line 32 to control logic 30.

Control logic 30 creates a signal defining required frequency on line 34. Line 34 connects to frequency generator 36, which creates a signal of the defined frequency on line 38. The signal on line 38 is connected to amplitude adjust system 40. Control logic 30 also creates a signal defining required amplitude on line 42. Line 42 connects to amplitude adjust system 40, which creates a signal of the defined frequency and the defined amplitude on line 44. The signal on line 44 is connected to offset adjust system 46. Control logic 30 also creates a signal on line 48 defining required offset. The signal on line 48 is connected to offset adjust system 46.

Offset adjust system 46 creates a signal of the defined frequency, the defined amplitude, and the defined offset on line 50. Line 50 is connected to power drive system 52, which creates an analog signal corresponding to this information on line 54, which controls oscillator 20. That may be a current or voltage signal, depending on the characteristics of oscillator 20. With respect to the oscillator of FIG. 1, that would be a current signal of varying levels delivered to coil 7 depending on the information defined by control logic 30.

Figure 4:
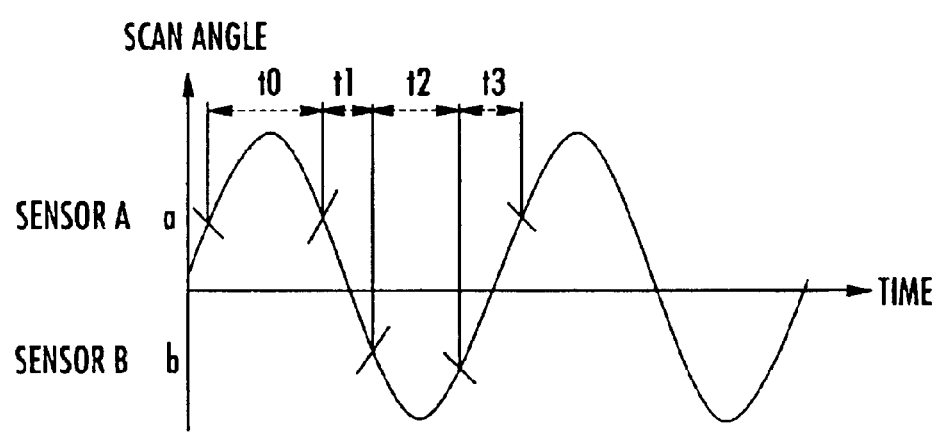
FIG. 4 illustrates scan angle versus time of the rotation of a typical torsion oscillator.

For purposes of discussion, FIG. 4 illustrates time versus scan angle of mirror 9 of a representative system corresponding to FIG. 3 having two light sensors corresponding to A and B of FIG. 3 located to receive scanned laser light beams from mirror 9 near the extremes of the scan. The electronic control logic 30 measures the time interval of signals from the light sensors, as well as controlling the drive level and frequency to coil 7.

As shown in FIG. 4, a time diagram of scan angle relative to the beam encountering the sensor is defined. A first sensor, sensor A, is known to be at a predetermined scan angle a (FIG. 3). After a beam crosses angle a moving toward outer limit 24a, the beam again is sensed by sensor A as it returns. The interval between these two crossings is time interval t0. Interval t0 is necessarily the period in which the amplitude of scan increases to its maximum and begins its return, as shown in FIG. 3. A second time interval t1 then occurs while the beam moves to be sensed by the second scanner, scanner B, known to be located where the beam is at scan angle b (FIG. 3). After crossing angle b the beam again is sensed by sensor B as it returns. The interval between these two crossings is time interval t2. The time internal t3 is that between the second consecutive sensing of the beam by Sensor B and the next sensing of the beam by Sensor A.

The amplitude, in terms of sweep angle in arbitrary units, is a function of the ratio of time intervals t0 and t1 or t2 and t3. The function defining amplitude is nearly linear when the values of all time intervals t0, t1, t2, and t3 are nonzero. However, for the purposes of the control methods described, the amplitude and offset functions do not necessarily have to be known explicitly.

The period is expressed as t0+t1+t2+t3, with the frequency of oscillation being the reciprocal of the period. The difference between t0 and t2 is a function of location of the sensors with respect to the median of the beam sweep and defines the median offset.

The primary control method first determines the existing resonant frequency. To do so the peak value of the alternating drive level to the torsion oscillator is held constant, and the drive frequency is swept over a small region around the expected nominal resonant frequency of the target device. This is done over a large enough range of frequencies to cover the cumulative contributions to resonant frequency variation. These include device manufacturing and assembly tolerances, and temperature. The control hardware is used to drive the scanner over this frequency range and at the same time, measure the resulting scan amplitude. Using a peak detection or inference, the controller identifies the frequency with the highest amplitude to be the resonant frequency at the present operating conditions. This is most likely to be done during printer power on reset (i.e., initialization at power on). With the resonant frequency identified and communicated to the printer engine, the electronic control sets the drive frequency.

In practice, the highest amplitude is found by finding either a minimum value of t1 or t3, or a maximum value of t0 or t2. Actual amplitude need not be calculated. Resonant frequency can be calculated, as defined as the reciprocal of period, and communicated to the printer engine. Alternatively, the resonant frequency can be obtained from the part of the controller used to generate the drive frequencies based on the resonant frequency requiring a lower drive level for a given scan amplitude.

It is not necessary to calculate scan characteristics in physical terms. For instance, it is not required to calculate the actual scan amplitude in terms of degrees of mirror deflection or millimeters of scan traverse. Instead the appropriate values of time intervals from FIG. 3 are determined by the designer which will produce the desired physical scan length or angle needed for printing. Then, the controller maintains these time intervals, in units of time counts, using traditional feedback control techniques.

Control Sequence

Figure 5:
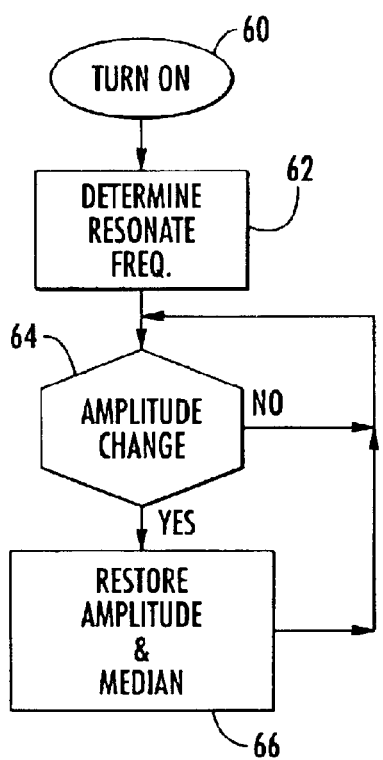
FIG. 5 illustrates a first control sequence in accordance with this invention.

FIG. 5 illustrates the sequence of control in accordance with a first control procedure of this invention. The first action is at power on (Turn On), action 60. This then proceeds to action 62 in which the resonant frequency of the oscillator is determined. Then the resonant frequency is monitored for change in decision 64, in the specific implementation by searching for a change in amplitude.

If decision 64 is no, the sequence returns to decision 64 at regular intervals. If decision 64 is yes, action 66 is implemented, which is to restore amplitude and median offset, done by increasing or decreasing drive level as required and adjusting the median of the drive level. The drive frequency is not changed. The sequence then proceeds to implement decision 64 at regular intervals until decision 64 is again yes, at which point action 66 is implemented. This continues indefinitely.

Figure 6:
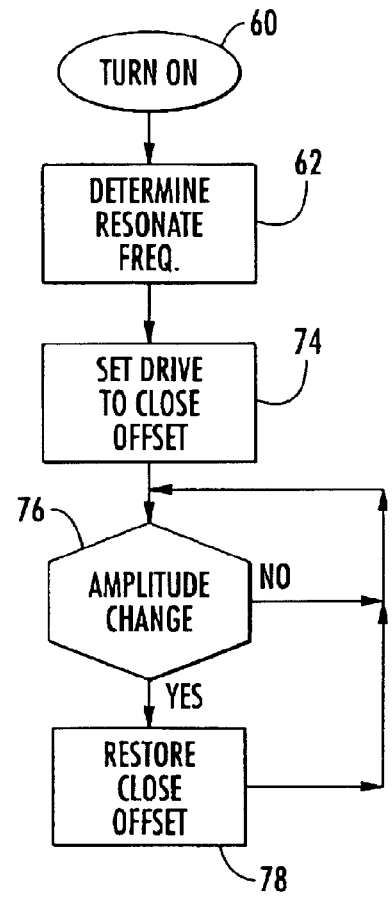
FIG. 6 illustrates a second control sequence in accordance with this invention.

FIG. 6 illustrates the sequence of control in accordance with a second control procedure this invention. As with the foregoing first procedure, the first action is at power on (Turn On), action 60. This then proceeds to action 62 in which the resonant frequency of the oscillator is determined. This then proceeds to action 74 in which the drive frequency is set offset close to the resonant frequency. Then the resonant frequency is monitored for change in decision 76, in the specific implementation by searching for change in amplitude.

If decision 76 is no, the sequence returns to decision 76 at regular intervals. If decision 76 is yes, action 78 is implemented, which restores the close offset between resonant frequency and drive frequency. The sequence then proceed to implement decision 76 at regular intervals until decision 76 is again yes, at which point action 78 is implemented. This continues indefinitely.

Practical Advantages

The ideal resonant scanner controller would continuously detect shifts in the device's resonant frequency and adjust drive frequency to match the resonant frequency. If the controller can find the resonant frequency of the scanner at every moment in time, it can always drive the scanner with the minimum required power for the desired amplitude. However, as the amplitude profile of FIG. 4 suggests, two different drive frequencies, arranged symmetrically about the resonance peak, will produce the same amplitude. This causes a problem with detecting resonant frequency shifts in real time. The disturbance to the system that the controller must track is the shift in resonant frequency, either above or below the resonance of the previous state.

Since the resulting amplitude can be produced by two different frequencies, the controller must decide which direction to direct the drive frequency to move to the new resonant frequency. Without additional information, the only way to detect the resonance peak is to sweep the drive frequency around the expected resonance and detect the peak value of amplitude. However, the purpose of the controller is to maintain expected scan characteristics continuously, especially during printing. Attempting to detect resonance through a frequency sweep while printing will undoubtedly create unacceptable print jitter.

One solution to this problem of this invention is the control procedure of FIG. 6, which always operates the scanner slightly off resonance. The scanner can be operated on the slopes on either side of the resonance peak, where a small region of the amplitude function is strictly increasing or decreasing. Within this small region, there is a one to one mapping between a change in resonant frequency and a change in amplitude. As long as the electronic control can react fast enough to prevent a disturbance from pushing operation past the other side of the resonance peak, the control can maintain operation at a fixed distance away from the resonance frequency. The difficulty with this technique is that desirable operation close to resonance carries a danger of instability, while a higher margin of safety requires operation farther from resonance, where the required drive level increases rapidly to maintain the desired scan amplitude.

Because of these difficulties, the solution of this invention in which the frequency is not changed is preferred except in these instances in which a particular system requires more power to maintain amplitude than is practicable and affordable.

Another proposed solution to the problem of detecting resonant frequency in real time is to provide additional information to the controller. Since resonant frequency is a strictly increasing function of temperature within the expected operating range of temperatures, adding temperature information to the controller inputs will solve the problem of not knowing which direction to adjust drive frequency to match the drifting resonant frequency. However, this temperature measurement must be of the scanner material itself, since thermal expansion of the material is responsible for resonant frequency drift. Ambient temperature measurements in the enclosure surrounding the device may not adequately reflect transient temperature changes in the device and would therefore not be useful to the controls. In addition, it has been shown in experiments that temperature changes on the order of 0.1 degrees C. have a significant impact on scanner resonant frequency changes.

Unfortunately, sensing devices capable of this accuracy are not readily available within the low cost constraints required by the printing applications, so implementation of this technique is unlikely.

What is claimed is:

1. A scanning apparatus comprising:

a light source for providing a beam of light;

a reflector disposed in the path of the beam of light to produce a reflected beam of light;

a mount for supporting the reflector, the mount including a torsion spring mechanism for holding the reflector for oscillation on the torsion spring mechanism, the reflector and the torsion spring mechanism having a resonant frequency of oscillation;

an oscillator for oscillating the reflector on the torsion spring mechanism at a frequency close to or at the resonant frequency of the reflector;

the oscillation of the reflector producing a scanning reflected light beam scanning along a scan path;

at least one sensor disposed in the scan path of the scanning reflected light beam for producing a sensor signal when the scanning reflected light beam illuminates the sensor; and a control and drive system for receiving the sensor signal and thereby monitoring the oscillation of the reflector, for producing a drive signal based on the oscillation of the reflector, said drive signal having a drive amplitude, a drive frequency close to or at the resonant frequency, and a drive offset, the drive signal being provided to the oscillator to drive the oscillator causing mechanical oscillation at the drive frequency and at a desired mechanical amplitude and offset.

2. The scanning apparatus of claim 1 wherein the control and drive system includes a power supply for providing power to the oscillator to oscillate the reflector wherein the control and drive system controls the power supplied to the oscillator to thereby control the oscillation of the reflector.

3. The scanning apparatus of claim 2 wherein the control and drive system controls the amplitude of the power supplied to the oscillator to control the amplitude of oscillation of the reflector.

4. The scanning apparatus of claim 2 wherein the control and drive system controls the frequency of the power supplied to the oscillator to control the amplitude of oscillation of the reflector.

5. The scanning apparatus of claim 1 wherein the control and drive system includes a power supply for providing power to the oscillator to oscillate the reflector and wherein the control and drive system controls the power to the oscillator to control the oscillation of the reflector, the control and drive system setting the frequency of power provided to the oscillator at a frequency that is offset from the resonant frequency by a frequency offset.

6. The scanning apparatus of claim 5 wherein the control and drive system controls the amount of the frequency offset to maintain the oscillation of the reflector at a desired oscillation amplitude.

7. The scanning apparatus of claim 5 wherein the control and drive system controls the frequency of the power to maintain a constant frequency of oscillation and controls the amplitude of the power to control the amplitude of the reflector oscillation.

8. The scanning apparatus of claim 1 wherein the reflector and the torsion spring mechanism are made of silicon crystal.

9. The scanning apparatus of claim 1 wherein the control and drive system controls the frequency of the power to maintain a constant frequency of oscillation and controls the amplitude of the power to control the amplitude of the reflector oscillation.

* * * * *